United States Patent [19]

Kitano et al.

[11] Patent Number: 4,715,865
[45] Date of Patent: Dec. 29, 1987

[54] METHOD FOR CONTROLLING VISCOSITY OF ORGANIC LIQUIDS AND COMPOSITIONS

[75] Inventors: Kissho Kitano, Ohi, Japan; Ilan Duvdevani, Leonia; Donald N. Schulz, Annandale, both of N.J.

[73] Assignee: Exxon Research and Engineering Company, Florham Park, N.J.

[21] Appl. No.: 806,416

[22] Filed: Dec. 9, 1985

Related U.S. Application Data

[63] Continuation-in-part of Ser. No. 625,974, Jun. 29, 1984, abandoned, which is a continuation-in-part of Ser. No. 565,106, Dec. 23, 1983, abandoned.

[51] Int. Cl.$^4$ .................................................. C10L 7/00
[52] U.S. Cl. ...................................... 44/7.3; 524/474; 524/560; 526/158
[58] Field of Search ................ 526/158; 524/474, 560; 44/7.1–7.7

[56] References Cited

U.S. PATENT DOCUMENTS

| | | | |
|---|---|---|---|
| 3,492,277 | 1/1970 | Clark et al. | 526/158 |
| 3,965,018 | 6/1976 | Heilman et al. | 526/158 |
| 4,460,757 | 7/1984 | Sato et al. | 526/158 |

*Primary Examiner*—Theodore Morris
*Attorney, Agent, or Firm*—Richard E. Nanfeldt

[57] ABSTRACT

A method of viscosifying an organic liquid which comprises adding a sufficient quantity of a hydrolyzed Ziegler Natta-ester containing copolymer having a molecular weight of about 100,000 to about 10,000,000 to said organic liquid to increase the viscosity of said organic liquid, said copolymer having the formula:

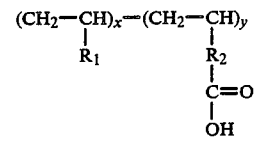

wherein $R_1$ is an alkyl group having about 4 to about 6 carbon atoms, $R_2$ is an alkylene group having about 3 to about 17 carbon atoms, x is about 95.0 to about 99.95 mole % and y is about 0.05 to about 5.0 mole %.

5 Claims, No Drawings

METHOD FOR CONTROLLING VISCOSITY OF ORGANIC LIQUIDS AND COMPOSITIONS

CROSS-REFERENCE TO RELATED APPLICATIONS

This application is a continuation-in-part application of U.S. Ser. No. 625,974, filed June 29, 1984, which in turn is a continuation-in-part of U.S. Ser. No. 565,106, filed Dec. 23, 1983 both now abandoned.

FIELD OF THE INVENTION

The instant invention relates to a process for controlling the viscosity of organic liquids by incorporating in said liquid a minor amount of a copolymer of an alpha olefin and a vinyl alkylene-carboxyic acid.

BACKGROUND OF THE PRIOR ART

Various U.S. patents have taught the concept of controlling the viscosity of organic liquids by the addition of various type polymers.

U.S. Pat. No. 3,366,430 teaches the gelling of organic liquids by the interaction of polar "associative bonds" which includes hydrogen bonding and "ionic cross linking". It is clear that the language of this patent limits this invention to gels. The instant invention is distinct from that cited in that the most preferred state is free of any said gel at ambient temperatures. This patent also teaches that these polymers "will generally be of the free radical addition type" (column 4, lines 5–7), since the preparation of polar polymers by Ziegler-Natta polymerization is difficult because "the polar groups required in the final polymer may interfere with the ionic catalyst used in the polymerization, [thus] it is usually necessary just to prepare the hydrocarbon polymer and then modify it to introduce the polar groups required for this associative bond". (Column 4, lines 54–59). Once again the instant invention is a Ziegler-Natta polymer with attached functional group not post introduction of a functional group.

U.S. Pat. No. 4,002,436 teaches polymer solutions of associative bonds (esspecially jet fuel solutions). However, the polymers of the instant invention are distinct from those of U.S. Pat. No. 4,002,436.

The polymers used in U.S. Pat. No. 4,002,436, "will generally be of the free-radical addition type". (Column 4, line 16–18) since the preparation of polar polymers by Ziegler-Natta polymerization is difficult because "the polar groups required in the final polymer may interfere with the ionic catalyst used in the polymerization, [thus] it is usually necessary first to prepare the hydrocarbon polymer and then modify it to introduce the polar groups required for the associative bond". (Column 4, lines 60–64). The instant invention uses a Ziegler-Natta polymer with an attached functional group.

U.S. Pat. No. 3,679,382 teaches the thickening of aliphatic hydrocarbons with synthetic organic polymers of alkylstyrene or lauryl acrylate and olefinically unsaturated emulsion copolymerizable acids, amides, hydroxyacrylic esters, sulfonic acids, etc. It is emphasized in this patent (column 3, lines 69–75) that it is critical that in the preparation of such polymers, no surface active agent, catalyst or other additive be employed which introduces a metallic ion into the system. Therefore, it is preferred to employ ammonium or amine salts.

The instant invention contains no alkylstyrenes or lauryl acrylates and the instant olefinically unsaturated acids and esters are not emulsion copolymerizable. The instant acids and esters have an alkyl spacer group separating the acid or ester from the olefinic double bond thus rendering them now polymerizable by free radical emulsion polymerization. The instant copolymers are prepared by Ziegler-Natta polymerization, which do indeed use metallic catalysts. Such metallic species are precluded from U.S. Pat. No. 3,679,382.

SUMMARY OF THE INVENTION

It has been discovered that the viscosity of organic liquids may be conveniently controlled by incorporating in said organic liquids a minor amount of a copolymer which is the reaction product of an alpha olefin and a vinyl alkylenecarboxylic acid formed by a Ziegler Natta polymerization. The copolymer is characterized as having a polymeric backbone which is substantially soluble in the organic liquid.

The number of acid groups contained in the copolymer is a critical parameter affecting this invention. The number of acid groups present in the copolymer can be described in a variety of ways such as weight percent, mole percent, number per polymer chain, etc. Mole percent will be empolyed to describe the copolymers in this invention.

The hydrolyzed Ziegler Natta ester containing copolymer of the instant invention which is a copolymer containing an alpha olefin and vinyl alkylenecarboxylic acid and/or vinyl alkylenecarboxylic esters having about 4 to about 20 carbon atoms, more preferably about 9 to about 18 and most preferably about 10 to about 16, wherein an alkyl group is situated between the acid or ester group and the carbon of the double bond of the monomer, wherein the resulting alkylenecarboxylic acid side groups are randomly distributed along the alpha olefin backbone. The alpha olefin has about 2 to about 27 carbon atoms, more preferably about 6 to about 25, and most preferably about 6 to about 18. The copolymer contains about 0.01 to about 5 mole % of the alkylenecarboxylic acid side groups more preferably about 0.05 to about 3 and most preferably about 0.1 to about 2. The number average molecular weight as measured by GPC of the alpha olefin copolymer is about 100,000 to about 20,000,000, more preferably about 100,000 to about 15,000,000, and most preferably about 100,000 to about 10,000,000.

The hydrolyzed Ziegler Natta containing ester copolymer of the alpha olefin and vinyl alkylenecarboxylic acid is formed by first hydrolyzing the organic ester with a base and optionally further treating with concentrated sulfuric acid or other suitable acids having a sufficiently low Ph to effect hydrolysis, wherein the hydrolysis occurs in a solvent which is inert itself to hydrolysis such as an aliphatic or aromatic hydrocarbon. The substantially complete hydrolysis of the copolymer of an alpha olefin and a vinyl alkylene ester and the optional acid treatment is represented by the reaction scheme:

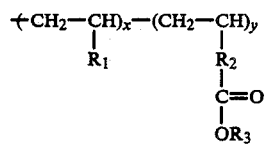

↓

Base Hydrolysis

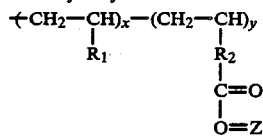

↓

Acid Treatment

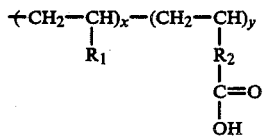

wherein Z is a mixture of H and an alkyl group having about 1 to about 25 carbon atoms, wherein H comprises about 55 to about 99 mole % of z, more preferably about 65 to about 95 mole %, and most preferably about 70 to about 90 mole %. $R_1$ is an alkyl group having about 4 to about 6 carbon atoms, $R_2$ is an alkylene group having about 3 to about 17 carbon atoms $R_3$ is an alkyl group having about 1 to about 25 carbon atoms, x is about 99.99 to about 95.0 mole %, more preferably about 99.95 to about 97.0, and most preferably about 99.90 to about 98.0.

The bases used in the hydrolysis of the ester species are selected from the group consisting of tBuO—, OH—, EtO—, nBuO— and Pro—.

It is evident that the copolymers covered within this invention encompass a broad class of hydrocarbon polymer systems. It is important that these hydrocarbon polymer backbones (in the absence of the acid groups) be soluble in the organic liquid, whose viscosity is to be controlled. To achieve the desired solubility, it is required that the polymer to be employed possess a degree of polarity consistent with that solvent. This solubility relationship can be redialy established by anyone skilled in the art simply by appropriate texts (e.g., Polymer Handbook edited by Brandrup and Immergut, Interscience Publishers, 1967, section V-341). In the absence of appropriate polymer-solvent compatibility knowledge, this can be determined experimentally by observing whether the selected polymer will be soluble in the solvent at a level of 1 g polymer per 100 ml solvent. If the polymer is soluble, then this demonstrates that it is an appropriate backbone for modification with acid groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention.

The solutions of the instant invention are prepared by dissolving the copolymer in an organic liquid which has a solubility parameter of less than 9.5 and a viscosity of less than about 35 centipoises and is selected from the group consisting of mineral oil, synthetic oil, lubricating oils, alkanes, cycloalkanes and aromatics and mixtures thereof. The concentration of the copolymer in the solution is about 0.4 to about 10 grams per 100 ml of organic liquid, more perferably about 0.5 to about 2. The viscosity of the solutions are about 10 to about 10,000 cp, when the concentration level of the polymer in solution is less than ablut 1 wt. %. When the concentration of the polymer in the solution is greater than about 1.0 wt. %, the viscosity of the solution can exceed 50,000 cps and extends to a gelled state.

The copolymers of the instant invention are improved viscosification agents for organic hydrocarbon liquids as compared to the copolymers of U.S. Ser. No. 565,106, filed Dec. 23, 1983, because the hydrolysis level is higher and more controlled than in the case of the acid hydrolyzed examples of U.S. Ser. No. 565,106.

DESCRIPTION OF THE PREFERRED EMBODIMENTS

The following are preferred embodiments of the instant invention.

EXAMPLE 1

Base Hydrolysis (10959-36) (#10)

A flask was charged with a solution of 1-octene-methyl-10-undercanoate copolymer prepared by Ziegler-Natta polymerization, as in Schulz, et al., U.S. Pat. No. 4,520,757 (May 21, 1985), (4.0 g) in 200 g THF and 0.82 g t-BuOK. The solution was heated to 50°–60° C. After one hour another 150 ml THF was added and 3.6 ml of 2N $H_2SO_4$ was added to neutralize the solution (pH=5). After cooling, the polymer was precipitated in 600 ml of water/isopranol (1:1 vol/vol.). The polymer was filtered washed with water and isopropanol, and dried to yield 4.0 g of product which had about 100% of the original ester groups hydrolyzed to carboxyl groups by IR. The viscosity of this polymer in xylene (2%) was 19 cP of $30s^{-1}$

EXAMPLE 2

Acid Treatment (10679-48)

2.0 g of the polymer prepared according to Example 1 was dissolved in 100 g xylene. A 3 ml quantity of concentrated $H_2SO_4$ was added at room temperature. The batch was stired for 1 hour at room temperature and subsequently precipitated in isopranol/water and dried under vacuum with heating. The polymer showed carbonyl and ester groups in the IR (75% COOH) and surprisingly showed an enchanced viscosity of 34 cP at $30s^{-1}$ at 2% concentration in xylene, which is higher than the solution viscosity shown in Example 1.

This example shows that there is an advantage in viscosification with an acid copolymer which was first hydrolyzed by a base. It is a surprising result since the acid content based on IR decreased after the treatment.

What is claimed is:

1. A method of viscosifying an organic liquid from about 10 to about 10,000 cps for polymer concentrations of less than about 1.0 wt. % which method comprises adding a sufficient quanity of a ester containing copolymer of an alpha-olefin and a vinyl alkylenecarboxylic acid copolymerized in the presence of a Ziegler-Natta catalyst having an acid content of from about 0.01 to 10 mole percent and a molecular weight of about 100,000 to about 10,000,000, wherein said copolymer of said alpha-olefin and said vinyl alkyl-enecarboxylic acid has the formula:

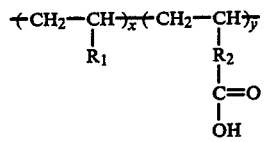

wherein $R_1$ is an alkyl group having 6 carbon atoms, $R_2$ is an alkylene group having 17 carbon atoms, x is about 95.0 to about 99.95 mole % and y is about 0.05 to about 5.0. mole %.

2. A method according to claim 1 wherein $R_1$ has 6 carbon atoms and $R_2$ has 8 carbon atoms.

3. A copolymer which has the formula:

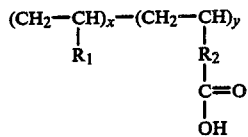

wherein $R_1$ is an alkyl group having about 4 to about 6 carbon atoms, $R_2$ is an alkyl group having about 3 to about 17 carbon atoms, x is about 95.0 to about 99.95 mole % and y is about 0.05 to about 5.0 mole %.

4. A copolymer according to claim 3 wherein $R_1$ has 6 carbon atoms and $R_2$ has 8 carbon atoms.

5. A method of viscosifying an organic liquid which comprises adding a sufficient quantity of a hydrolyzed Ziegler Natta ester containing copolymer having a molecular weight of about 100,000 to about 10,000,000 to said organic liquid to increase the viscosity of said organic liquid from about 10 to about 10,000 cps for polymer concentrations of less than about 1 weight %, said copolymer having the formula:

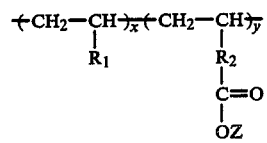

wherein $R_1$ is an alkyl group having about 6 carbon atoms, $R_2$ is an alkylene group having about 17 carbon atoms, x is about 95.0 to about 99.95 mole % and y is about 0.05 to about 5.0 mole %, where Z is a mixture of H and an alkyl group having about 1 to about 25 carbon atoms wherein H comprises about 55 to 99 mole % of Z.

* * * * *